(12) United States Patent
Chen

(10) Patent No.: US 7,787,995 B2
(45) Date of Patent: Aug. 31, 2010

(54) METHOD AND SYSTEM FOR CONTROLLING AN OPERATION OF AN ELECTRICAL POWER NETWORK

(75) Inventor: Dingguo Chen, Eden Prairie, MN (US)

(73) Assignee: Siemens Energy, Inc., Orlando, FL (US)

( * ) Notice: Subject to any disclaimer, the term of this patent is extended or adjusted under 35 U.S.C. 154(b) by 383 days.

(21) Appl. No.: 11/712,814

(22) Filed: Mar. 1, 2007

(65) Prior Publication Data

US 2007/0211887 A1    Sep. 13, 2007

Related U.S. Application Data

(60) Provisional application No. 60/779,845, filed on Mar. 7, 2006.

(51) Int. Cl.
| G05D 11/00 | (2006.01) |
| G01R 31/00 | (2006.01) |
| G01R 21/00 | (2006.01) |
| G08B 21/00 | (2006.01) |

(52) U.S. Cl. .................. 700/286; 340/657; 700/291; 700/292; 702/58; 702/59; 702/60

(58) Field of Classification Search .......... 700/286, 700/291, 292; 702/58, 59, 60; 340/657
See application file for complete search history.

(56) References Cited

U.S. PATENT DOCUMENTS

| 4,136,393 | A | * | 1/1979 | Fox ............................ 700/291 |
| 4,166,975 | A | * | 9/1979 | Germer et al. .............. 324/116 |
| 5,487,002 | A | * | 1/1996 | Diller et al. ..................... 701/1 |
| 6,681,156 | B1 | * | 1/2004 | Weiss .......................... 700/291 |
| 6,865,509 | B1 | * | 3/2005 | Hsiung et al. ............... 702/182 |
| 7,058,522 | B2 | | 6/2006 | Chen |
| 7,092,798 | B2 | * | 8/2006 | Mansingh et al. ........... 700/292 |
| 7,233,843 | B2 | * | 6/2007 | Budhraja et al. ............ 700/291 |
| 7,321,810 | B2 | * | 1/2008 | Mansingh et al. ........... 700/286 |
| 7,454,270 | B2 | * | 11/2008 | Mansingh et al. ........... 700/291 |
| 2004/0249775 | A1 | | 12/2004 | Chen |
| 2004/0257059 | A1 | | 12/2004 | Mansingh et al. |
| 2004/0257858 | A1 | | 12/2004 | Mansingh et al. |
| 2004/0260489 | A1 | | 12/2004 | Mansingh et al. |
| 2006/0041405 | A1 | * | 2/2006 | Chen et al. ...................... 703/2 |
| 2006/0184472 | A1 | | 8/2006 | Chen |

* cited by examiner

Primary Examiner—Albert Decady
Assistant Examiner—Thomas H Stevens

(57) ABSTRACT

A system (400) and method for controlling an operation of an electrical power network (420) is described. The method includes configuring an allowable performance of an electrical power network over a predetermined time period as a probability expression comprising a historical term and a future term having an electrical power network operating condition variable. The method also includes calculating a network performance target value (300) according to the probability expression by using a historical electrical power network operating condition value for the electrical power network operating condition variable. The method further includes using the performance target value for controlling the electrical power network effective to achieve the allowable performance. The system includes a database (406), a processor (404) coupled to the database, and a monitoring and control module (410) coupled to the processor.

2 Claims, 3 Drawing Sheets

METHOD AND SYSTEM FOR CONTROLLING AN OPERATION OF AN ELECTRICAL POWER NETWORK

This application claims the benefit of U.S. Provisional Patent Application No. 60/779,845, filed Mar. 7, 2006, which is incorporated herein by reference.

FIELD OF THE INVENTION

The present invention relates to a method and system for controlling an operation of an electrical power network, and, in particular, to a method and system for monitoring a performance of the network, for calculating a network performance target value based on historical performance data, and for controlling the production of power in the network responsive to the target.

BACKGROUND OF THE INVENTION

Independent system operators (ISOs) of electrical power networks are required to monitor and operate within certain power generation performance standards. These performance standards determine the amount of imbalance that is permissible for reliability on power networks. Currently, ISOs operate by reacting to power trends as well as scheduled power interchange. Typically, operators provide regulatory agencies with schedule information detailing the quantity of energy and the time that energy will be produced. These schedules of energy vary over the course of a year, month, week, day, hour and other intervals of time such as seasons and special days such as holidays and weekends. Despite knowing that such energy requirements vary considerably at times, operators are often tasked with the burden of meeting demand for real-time and unanticipated shortage in energy. Meeting these unanticipated demands is often the cause of increased energy costs. Under certain circumstances, energy costs may decrease when an oversupply of energy exists in the marketplace. As readily apparent, there is a significant need for a method and system which allows for compliance with the control performance standards set by regulatory authorities such as NERC (North American Electric Reliability Council).

BRIEF DESCRIPTION OF THE DRAWINGS

The invention is explained in the following description in view of the drawings that show.

DETAILED DESCRIPTION OF THE INVENTION

Figure 1:
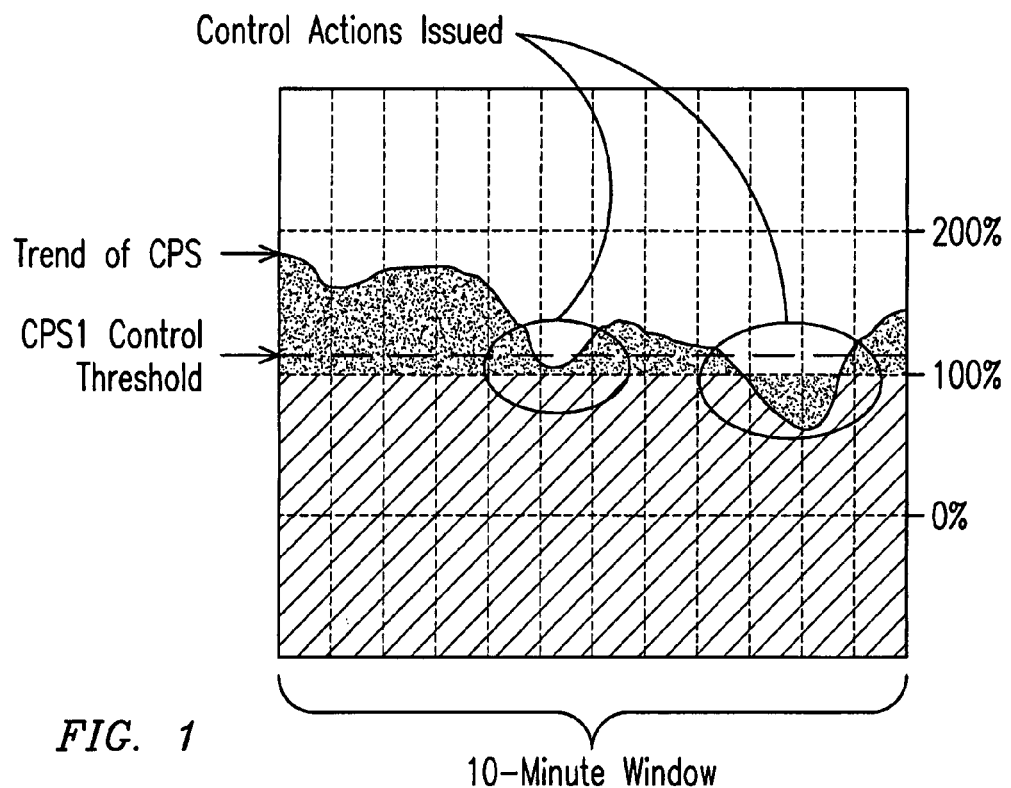
FIG. 1 illustrates a ten minute window of example ACE variances about a CPS1 control threshold.

System operators have found it a challenge to readily match changes in load requirements with power generation for their control areas. Nevertheless automatic generation control systems have attempted to control this mismatch between sources of power and uses of power, by balancing real-power and by stabilizing frequency. As a guide to power and load management, NERC has provided control performance standards aimed at minimizing any adverse effects on neighboring control areas. To be in compliance with these NERC requirements, a system operator must balance its generation and interchange schedules with its load.

As a measure of conformity to the control performance standards, a first compliance factor know as ACE (Area Control Error) is applied to the power network's operations. For purposes of illustration, the ACE equation is shown below in a slightly simplified form:

$$ACE_i = (I_A - I_S) - 10B(F_A - F_S) \quad (1)$$

where I refers to the algebraic sum of all power (MW) flows on tie-lines between a control area and its surrounding control areas, F is the interconnection frequency (Hz), A is actual, S is scheduled, and B is the control area's frequency bias (MW/0.1 Hz). Frequency bias is the amount of generation needed to respond to a 0.1 Hz change in interconnection frequency. It is normally set to the supply-plus-load response of a control area to a change in interconnection frequency. The first terms shows how well the control area performs in matching its schedules with other control areas. The second term is the individual control area's contribution to the interconnection to maintain frequency at its scheduled value. Accordingly, $ACE_i$ is the instantaneous difference between actual and scheduled interchange, taking into account the effects of frequency. It measures how well a control area manages its generation to match time-varying loads and scheduled interchange.

NERC has also defined several other minimum Control Performance Standards (CPS), namely CPS1, and CPS2. CPS1 is a yearly measure of one-minute averages and is shown below:

$$AVG_{12-month}\left[\left(\frac{ACE_i}{-10B_i}\right)_i \Delta F_i\right] \leq \varepsilon_1^2 \quad (2)$$

or equivalently, $$CPS1 = \left(2 - AVG_{12-month}\left[\left(\frac{ACE_i}{-10B_i}\right)_i \Delta F_i\right] \Big/ \varepsilon_1^2\right) \times 100\% \geq 100\% \quad (3)$$

where $AVG_{12-month}$ is the 12 month average, $ACE_i$ is the clock-minute average of ACE (tie-line bias ACE), $B_i$ is the frequency bias of the control area, $\varepsilon_i$ is the interconnections' targeted frequency bound; and $\Delta F_i$ is the clock-minute average frequency error. In short, CPS1 measures the relationship between ACE and interconnection frequency on a 1-minute average basis. If the above equation is evaluated for the various instantaneous inputs into $ACE_i$, the resultant should be greater than or equal to 100% or a compliance factor of 1. Throughout the year, system operators attempt to monitor and control power generation to meet the CPS1 objective.

An evaluation of the current 1-minute $ACE_i$ average is made, and then at each AGC cycle, an instantaneous NERC CPS1 percentage or compliance factor is calculated. Depending on the resultant values as well as other input data, regulating controls signals are generated. The calculated CPS1 compliance factor is compared to the CPS1 target value set by the system operator. Whenever, the CPS1 falls below 1, a correction signal is generated.

Although the CPS1 target value is normally set to 1 (100%), the system operator may set the CPS1 target value higher or lower depending on the operators prior 12 month performance. For example, as shown in FIG. 1, a control threshold is set for 100% and whenever, the instantaneously calculated CPS1 percentage falls below the 100% threshold, a correction signal is generated. Alternatively, a trend within that 10-minute window or any other period may be used as a basis for determining a control action that may be required.

As a secondary NERC requirement, CPS2 performance standard requires that the average ACE for each of the six ten-minute periods during an hour must be within specific limits referred to as $L_{10}$. Under CPS2, the standard requires a 90% compliance of the 10 minute ACE averages over a month or on average, no more than 14.4 violations over a 24 hour period. Moreover, CPS2 compliance requires that the ACE ten minute average be less than or equal to the $L_{10}$ average as shown below. NERC requires 90% compliance of 10-minute ACE averages over 1 month. The CPS2 standard can be defined as:

$$\text{Avg}_{10\text{-}minute}[ACE_i] \leq L_{10} \tag{4}$$

where $ACE_i$ is the clock-minute average of ACE (i.e., tie-line bias ACE) and $L_{10}$ is defined as:

$$L_{10} = L_{pr} \cdot \epsilon_{10} \cdot \sqrt{(-10B_i)(-10B_s)} \tag{5}$$

where $\epsilon_{10}$ is a constant derived from the targeted frequency bound, $L_{pr}$ is a constant equal to 1.65 used to convert the frequency target to 90% probability, $B_i$ is the frequency bias of the control area, and $B_s$ is the sum of frequency bias settings of the control areas in the respective interconnection.

CPS2 is a monthly standard that limits unscheduled power flow. It is also a numeric measure of ACE (in MW) over all 10 minute periods within a month. Under CPS2, ACE is limited to within a band bounded by $L_{10}$ limits. For the most part, industry compliance of the CPS2 standard is accomplished through trend analysis or time weighted factors. Rising and waning 10 minute ACE averages are tracked and responded to by the noting the direction and slope of the collected 10 minute average data points. Action may be taken within a predefined threshold value reached prior to crossing the $L_{10}$ limits or may be set to trigger upon a detected violation of the $L_{10}$ thresholds. Although $L_{10}$ establishes CPS2 performance limits, system operators may operate within a narrower standard of performance, namely, control threshold values, so as to avoid CPS2 violations rather than reacting to $L_{10}$ violations. The control threshold values are set by system operators and determined by historical field data, power generation algorithms and variations of the $L_{10}$ equation 5. (i.e. 90% of $L_{10}$ boundaries)

Figure 2:
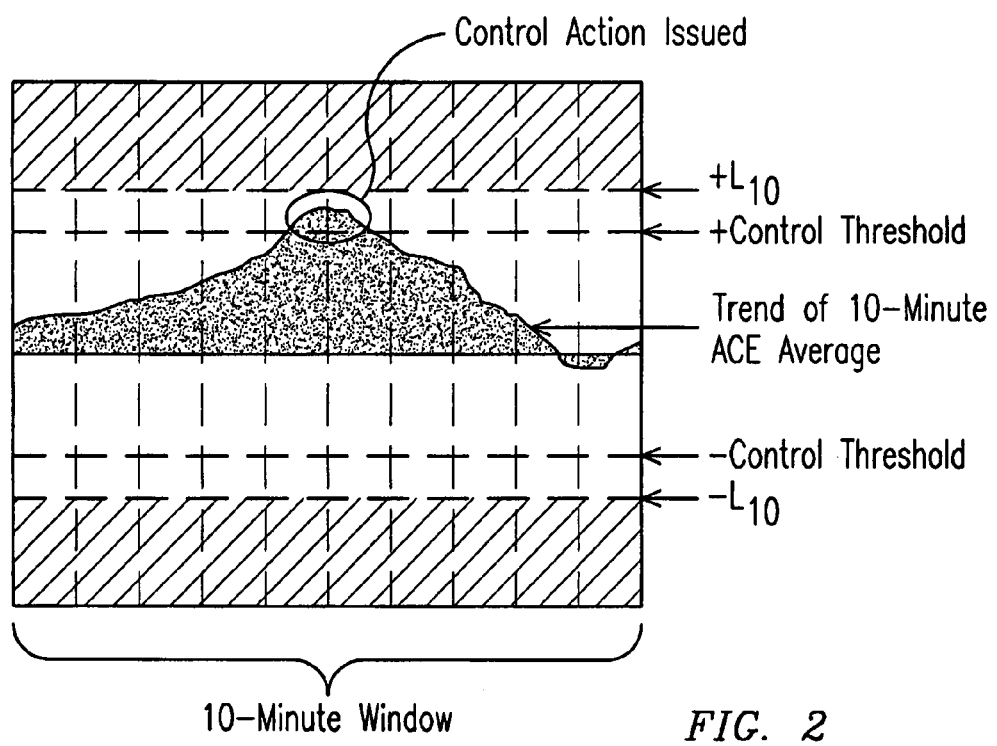
FIG. 2 illustrates a ten minute window of example ACE variances about a CPS2 control threshold $L_{10}$.

For example, and as shown in FIG. 2, a snapshot of a 10 minute window reveals the occurrence of a CPS2 threshold violation (not an $L_{10}$ violation) at the fifth minute of the 10 minute interval. Under these circumstances, a system operator may take corrective action to change the ACE value away from the threshold values and $L_{10}$ limits. Whether performance is guided by $L_{10}$ limits or threshold values, is a matter of choice. The present invention may be applied to any operating band as set for by the system operator.

Unlike the above trend based corrective actions, the present invention uses a real time control strategy that is based on the foundations of probability theory for providing predictive CPS1 and CPS2 control. In an example embodiment, a method includes calculating the CPS1 performance over a moving 12-month time period and the CPS2 performance over the present month and then adjusting the control effort based on up-to-date CPS1/CPS2 performance numbers at a certain time, and how much time is remaining in the 12-month time period and the current month. It should be understood that although the following examples focus on CPS1 compliance, the present invention is also applicable to CPS2 or any other performance standard. In particular, the CPS2 methodology described in commonly assigned, pending U.S. patent application Ser. No. 11/157,056 now U.S. Pat. No. 7,129,439, may be used in conjunction with the present invention to manage power flow in a power network.

In an example embodiment of the present invention, a method for controlling an operation of an electrical power network may include configuring an allowable performance of an electrical power network over a predetermined time period as a probability expression comprising a historical term and a future term having an electrical power network operating condition variable. The method may then include calculating a network performance target value according to the probability expression by using a historical electrical power network operating condition value for the electrical power network operating condition variable. The method may further include using the performance target value for controlling the electrical power network effective to achieve the allowable performance.

A corrective action for satisfying the CPS1 requirement may be determined by comparing a calculated one minute ACE target value with a calculated running one minute average ACE. When an absolute value of the running one minute average ACE is less than the corresponding one minute ACE target, no corrective action is generally required. Conversely, when the absolute value of the running one minute average ACE is greater than the corresponding one minute ACE target, corrective action may be necessary.

In an aspect of the invention, the CPS1 term may be expressed as a probability corresponding to a number of past clock periods during a 12 month time period and a number of future clock periods in the 12 month time period. The term $n_T$ may be used to designate the number of total clock-minute time intervals within a time period T. A 12-month time period T has ($n_T$=365 days/year×24 hours/day×60 1-minute intervals/hour) 525600 clock-minute time intervals. The term $n_t$ may be used to denote a number of clock-minute time intervals until a present time within a desired 12-month time period T, i.e. past clock periods. The term $n_{T-t}$ may be used to denote the number of remaining clock-minute time intervals until the end of period T, i.e., future clock periods. To simplify a derivation of a probability expression, term X may be used to represent:

$$X = \left[ \left( \frac{ACE_i}{-10B_i} \right)_i \Delta F_i \right] \tag{6}$$

Accordingly, the CPS1 standard may be equivalently expressed in probabilistic terms as an expected value:

$$\overline{X} = E\{X\} \leq \epsilon_1^2 \tag{7}$$

with the assumption that the expected value of X ($E\{X\}$) equals its time average over a sufficiently long time period. Accordingly, the expected value, or average, of X during the $n_t$ clock-minute time period may be denoted by $\overline{X}_1$, and the expected value, or average, of X during the remaining $n_{T-t}$ clock-minute time period may be denoted by $\overline{X}_2$. Equation (7) then becomes:

$$\overline{X} = \frac{n_t}{n_t + n_{T-t}} \overline{X}_1 + \frac{n_{T-t}}{n_t + n_{T-t}} \overline{X}_2 \leq \varepsilon_1^2 \tag{8}$$

where $n_T = n_t + n_{T-t}$, and $n_t$, $n_{T-t}$ and $n_T$ are all known, and the average of X during the $n_t$ clock-minute time period $\overline{X}_1$ may be computed with historical data using Equation (9):

$$\overline{X}_1 = AVG_{n_t Clock-MinuteTimeIntervals}\left[\left(\frac{ACE_i}{-10B_i}\right)_i \Delta F_i\right] \quad (9)$$

Therefore, Equation (8) may be expressed in terms of the average of X during the remaining $n_{T-t}$ clock-minute time period, $\overline{X}_2$ as:

$$\overline{X}_2 \leq [(n_t + n_{T-t})\epsilon_1^2 - n_t \overline{X}_1]/n_{T-t} \quad (10)$$

where $\overline{X}_2$ represent a statistical target for $$\left[\left(\frac{ACE_i}{-10B_i}\right)_i \Delta F_i\right]$$

for the remaining $n_{T-t}$ clock-minute time horizon. This statistical target can be lower or higher depending on the CPS1 performance up until a current point in time. Consequently, a prediction of a future target may be based on past CPS1 performance.

CPS1 performance requires that for every clock-minute:

$$\left[\left(\frac{ACE_i}{-10B_i}\right)_i \Delta F_i\right] \leq [(n_t + n_{T-t})\epsilon_1^2 - n_t \overline{X}_1]/n_{T-t}. \quad (11)$$

If Equation (11) is satisfied for every clock-minute for the remaining $n_{T-t}$ clock-minute time horizon, then a desired performance of $\overline{X}_2 \leq [(n_t + n_{T-t})\epsilon_1^2 - n_t \overline{X}_1]/n_{T-t}$ may be achieved.

In an example embodiment of the invention, a just prior clock-minute average frequency error $\Delta F_i$ can be used as a current clock-minute average frequency error to calculate a current clock-minute ACE target, which in turns allows determination of an eventual CPS1 based control amount. When $\Delta F_i > 0$, equation (11) may be rearranged as:

$$ACE_i \leq \{[(n_t + n_{T-t})\epsilon_1^2 - n_t \overline{X}_1]/n_{T-t}\}(-10B_i)/\Delta F_i \quad (12)$$

Conversely, when $\Delta F_i < 0$, then equation (11) may be rearranged as:

$$ACE_i \geq \{[(n_t + n_{T-t})\epsilon_1^2 - n_t \overline{X}_1]/n_{T-t}\}(-10B_i)/\Delta F_i \quad (13)$$

In another example embodiment, a largest clock-minute average frequency error $\Delta F_i$ (in absolute value), denoted by $(\Delta F_i)_m = \max_i(\{|\Delta F_i|\})\text{sign}(\Delta F_i)$, among a past larger time period (for instance, the previous 30-minute time period) may be used.

The clock-minute ACE target $ACE_t$ may be calculated, for example, using a just prior clock-minute average frequency error or a largest clock-minute average frequency error, as:

$$ACE_t = \{[(n_t + n_{T-t})\epsilon_1^2 - n_t \overline{X}_1]/n_{T-t}\}(-10B_i)/(\Delta F_i)_m \quad (14)$$

This clock-minute ACE target ($ACE_t$) may be calculated on a minute-by-minute (minutely) basis. The CPS1 control scheme requires that CPS based AGC must take appropriate control actions such that the algebraic value of the current average 1-minute average ACE is below the calculated CPS1 1-minute average ACE target ($ACE_t$), as shown in Equation (14).

Once the ACE target has been calculated, a system operator may correlate, through historical data or a performance algorithm, the amount of power correction necessary to achieve the desired ACE target. In an example embodiment of the invention, the amount of power produced as a corrective action to comply with the CPS1 standard is based on the calculated ACE target and a sum of the deviations between the calculated ACE target and the instantaneous ACE values from the beginning of a particular period, such as the 12 month monitoring period. As shown in the flow chart of FIG. 3, the amount of power to be generated to achieve CPS1 compliance requires the calculation of the ACE target ($ACE_t$) as provided for in equation 14. It should be understood that these $ACE_t$ values may be calculated at any period of time or interval, but may typically be calculated at the end of each monitoring interval, although calculations may be done more often during each AGC monitoring cycle. The AGC monitoring cycle for a power network is the time during which performance is monitored and control signals are generated. In one embodiment of the present invention, the ACE target is calculated at an AGC monitoring cycle of 4 seconds, although 1 minute monitoring cycles, or any other interval may be used. Moreover, the ACE target values may be calculated for current, past or future (expected/predicted) time intervals and are used as reference points and performance guides.

Figure 3:
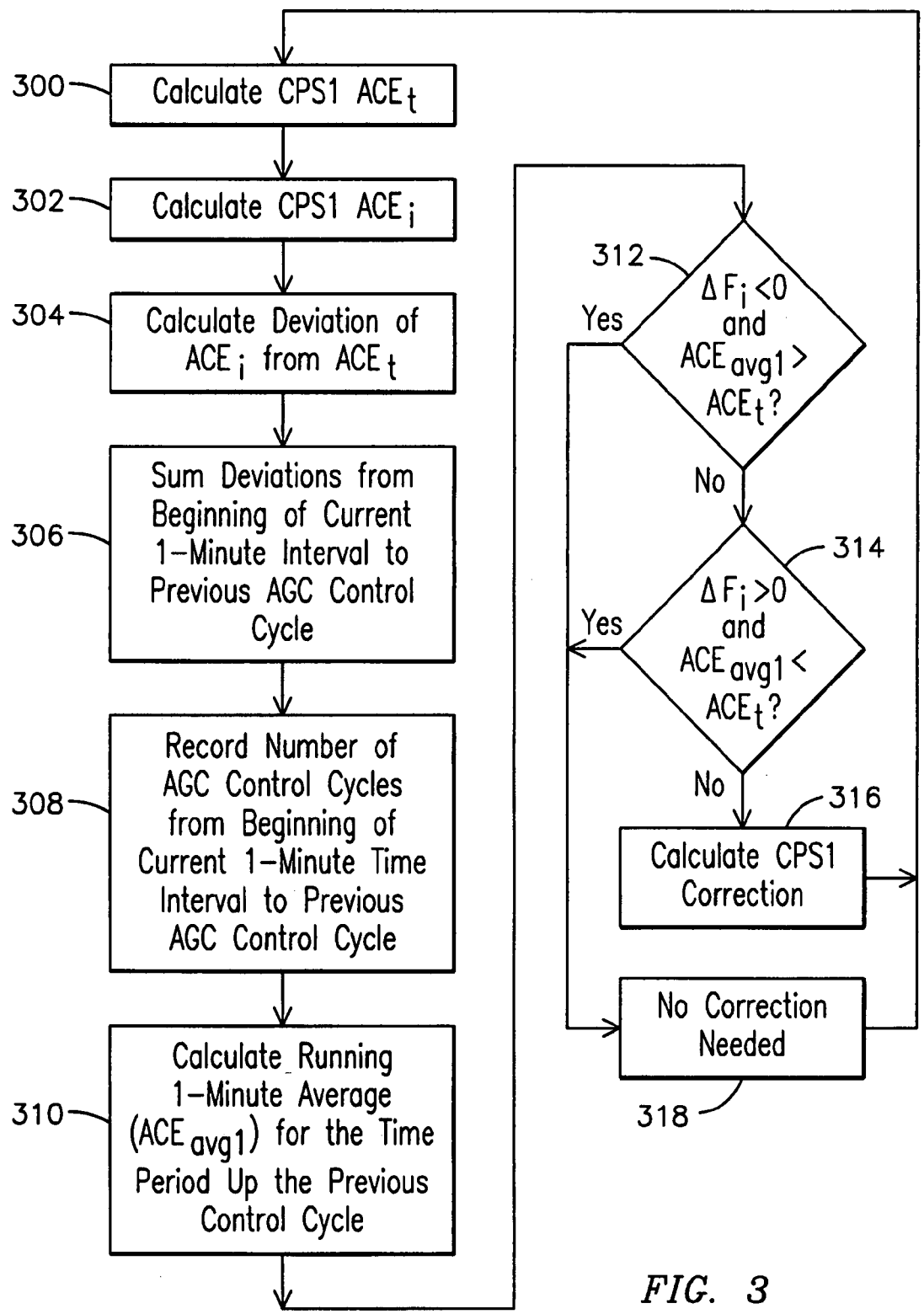
FIG. 3 shows a flow chart of an example method for controlling an electrical power network.

To determine the type and extent of power network control necessary, and as shown in the flow chart of FIG. 3 step 300, the ACE target ($ACE_t$) for the current 1 minute time interval is calculated, for example, according to equation (14). The instantaneous ACE value ($ACE_i$) for the current monitoring time interval is then calculated in step 302. In step 304 a -difference or deviation from the corresponding ACE target ($ACE_t$) is determined and may be stored in a memory of a monitoring and control system. The deviations from the ACE target values may be -algebraically calculated as:

$$\Delta ACE_i = ACE_i - ACE_t \quad (15)$$

During each subsequent monitoring time interval, a corresponding deviation is calculated and summed with previous calculated deviations. The deviations may be summed from a first monitoring time interval to a just prior monitoring interval within a monitoring period or selected time interval of interest (although any combination or subset of the stored deviation values may be used). In an example embodiment, the deviations, $\Delta ACE_i$, may be summed from a beginning of a current 1 minute interval to previous AGC control cycle 306. The resulting summed deviations may be denoted as $\Sigma \Delta ACE_i$. The total number of monitoring time intervals from the beginning interval to the just previous interval is denoted and stored. For example, the number of AGC control cycles, #Cycles, from the beginning of the current 1 minute time interval to the previous AGC control cycle is recorded in step 308.

In step 310, a running 1 minute ACE average, $ACE_{avg1}$, for the time period up to the current monitoring time interval may be calculated as follows:

$$ACE_{avg1} = \Sigma \Delta ACE_i / \#Cycles + ACE_t \quad (16)$$

To determine whether corrective action is necessary, and as shown in step 312, a first determination is made whether $\Delta F_i$ is less than 0 and $ACE_{avg1}$ is greater than $ACE_t$. If true, no correction is needed and processing continues to step 318. Otherwise, at step 314 a second determination may be made whether $\Delta F_i$ is greater than 0 and $ACE_{avg1}$ is less than $ACE_t$. If true, no correction is needed and processing continues to step 318. Otherwise, a CPS 1 correction may be required at step 316. The correction amount may be calculated from the following equation:

$$Correction_i = -(\Delta ACE_{i-1} + ACE_t) \quad (17)$$

This correction may be clamped to the system-allowed single cycle maximum correction in quantity without considering the sign. The first term in the expression of Correction is simply an integral action which may be taken in negative feedback to reduce the integrated deviation of the instantaneous ACE from its 1-minute average ACE.

As previously described, there are several performance standards by which system operators must comply. However, it should be understood that when multiple compliance standards such as CPS1 and CPS2 require simultaneous compliance, the higher priority compliance standard shall prevail. For example, since CPS2 control standard has higher priority than CPS1, if CPS2 correction and CPS1 correction are in the same direction, the larger correction amount will be used for AGC control; if CPS1 correction and CPS2 correction are in opposite directions, only CPS2 correction will be used for AGC control, and CPS1 correction is ignored; if CPS1 correction is zero and CPS2 is non-zero, CPS2 correction will be used for AGC control; if CPS2 correction is zero and CPS1 is non-zero, CPS1 correction will be used for AGC control; if both CPS1 correction and CPS2 correction are zero's, no CPS correction will be included in AGC control.

Figure 4:
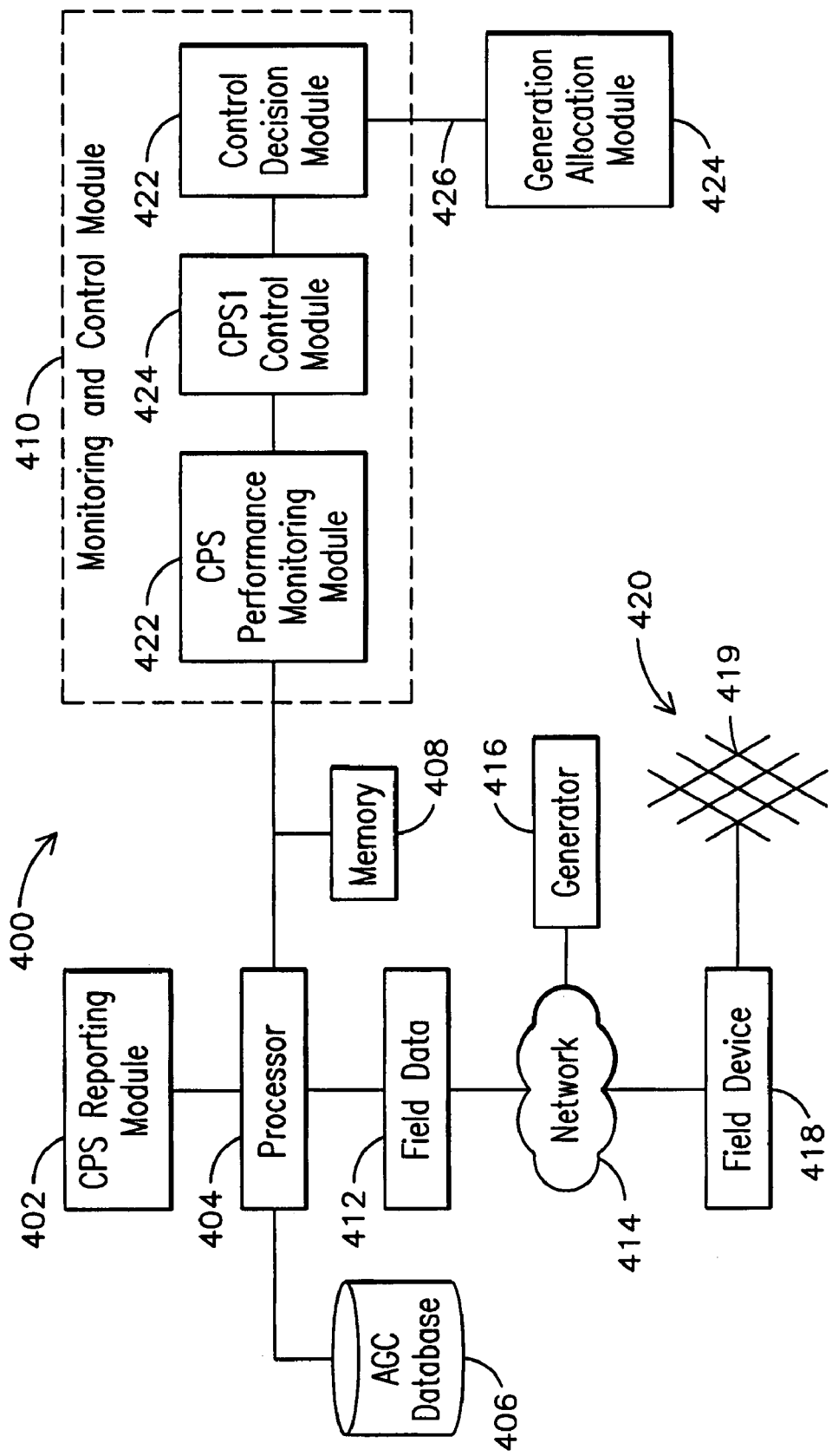
FIG. 4 shows a block diagram of an example system for controlling electrical power network.

FIG. 4 shows a block diagram of an example system 400 for controlling an electrical power network 420 that may include an electrical power distribution grid 419 and one or more generators 416. The monitoring and control system 400 as shown may include a database 406, such as an AGC database, for storing electrical power network performance data and one or more processor(s) 404 coupled to the database 406 for calculating a performance target value according to a probability expression comprising a historical term and a future term having an electrical power network operating condition variable by using a historical electrical power network operating condition value extracted from the electrical power network performance data for the electrical power network operating condition variable. The system 400 may also include a monitoring and control module 410 coupled to the processor 404 for using the performance target value to generate a network control signal for controlling the electrical power network effective to achieve the allowable performance.

The monitoring and control system 400 depicted in FIG. 4 may be used for NERC CPS1 Compliance wherein one or more processors 404 for the execution of monitoring and control software and operating system software. Processor 404 may take any form known in the art, for example, an analog or digital microprocessor or computer, and it may be integrated into or combined with one or more processors used for other functions related to power flow monitoring of the network 420. In an aspect of the invention, the processor 404, its operating system, and related applications (e.g. executable code) may be executed in a real-time or nearly real-time basis. Memory 408 may include one or more ROMs, PROMs, EROMs, EPROMs, RAMs, SRAMS, DRAMs, FPM DRAMS, EDO DRAMs, SDRAMs, DDR SDRAM, RDRAM, MEMORY STICKS, FLASH MEMORY, VIRTUAL MEMORY and/or electronic circuitry cable of storing program instructions and/or configuration data. Memory 408 may be connected to processor(s) 404 and to database 406 stored on storable medium such as a hard drive, CD or diskette or any other non-volatile means of storage.

Database 406, such as AGC database, may be connected to and accessible by the one or more processors 404 and stores monitoring and control data and applications related to the monitoring and controlling a power network. From external field data 412 and field device(s) 418, such as a SCADA network, monitoring data is feed to a monitoring and control module 410 comprising a CPS Performance module 422, a CPS1 Control Module 424, and a Control Decision Module 422. As used herein it should be understood that a module is a computer program functioning as either stand-alone software or software that is part of another application dedicated to the performance of a particular function.

The processor(s) 404 forwards to CPS Performance Monitoring Module 422, field data such as net interchange and actual frequency data necessary for the calculation of an instantaneous ACE value. The calculated instantaneous ACE value and related field data are sent to the CPS1 Performance Control Module 424 wherein ACE target values, deviations from target values, summed deviations, the sum of monitoring intervals, 1 minute average ACE values and control threshold values are calculated and stored in memory 408. Field and calculated data are then sent to the Control Decision Module 422, where a determination is made of the corrective action to be taken. If there is a need for corrective action, the Control Decision Module 422 generates a network control signal 426 for the Generation Allocation module 424. The Generation Allocation module 424 will determine or assign power network equipment or components necessary to take corrective action. If for example, additional power is necessary to maintain CPS1 compliance, processor(s) 404 sends a generation command via the network 414 to Generator 416.

Based on the foregoing specification, the exemplary methods described for controlling an operation of an electrical power network may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

In an example embodiment, the computer readable media may include computer-readable code for calculating a performance target value according to a probability expression comprising a historical term and a future term having an electrical power network operating condition variable by using a historical electrical power network operating condition value extracted from the electrical power network performance data for the electrical power network operating condition variable. The computer readable media may also include computer-readable code for using the performance target value to generate a network control signal for controlling the electrical power network effective to achieve the allowable performance. In an example application, the computer readable media may be used for upgrading an existing AGC and/or CPS control system for an electrical power network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling an operation of an electrical power network, comprising:
   representing an allowable control performance standard of an electrical power network over a predetermined time period as a probability expression comprising a historical term for elapsed time of the predetermined time period, a future term for remaining time of the predetermined time period, and an electrical power network operating condition value;
   determining a value of the historical term responsive to historical operating parameters;
   calculating a network clock-minute ACE target value for the remaining time according to the probability expression, the value of the historical term, and the remaining time and using a historical value for the electrical power network operating condition value;
   determining an instantaneous performance value of the electrical power network;
   calculating a deviation ratio between the performance target value and the clock-minute ACE instantaneous value for a monitoring interval;
   calculating a sum of respective deviations between the performance target value and the clock-minute ACE instantaneous value for a plurality of monitoring intervals;
   calculating a deviation ratio of the sum of respective deviations and a number of the plurality of monitoring intervals; and
   using the performance target value for controlling the electrical power network to satisfy the control performance standard.

2. The method of claim 1, further comprising calculating an average clock-minute ACE target value responsive to a sum of the deviation ratio and the clock-minute ACE target value.

* * * * *